(12) United States Patent
Choi (10) Patent No.: US 9,131,166 B2
(45) Date of Patent: Sep. 8, 2015

(54) AUDIO-VIDEO SYSTEM FOR SPORTS CAFES

(76) Inventor: Hae-Yong Choi, Seoul (KR)

( * ) Notice: Subject to any disclaimer, the term of this patent is extended or adjusted under 35 U.S.C. 154(b) by 584 days.

(21) Appl. No.: 13/589,338

(22) Filed: Aug. 20, 2012

(65) Prior Publication Data

US 2013/0050578 A1 Feb. 28, 2013

(30) Foreign Application Priority Data

Aug. 29, 2011 (KR) .................... 10-2011-0086251

(51) Int. Cl.
*H04N 5/45* (2011.01)
*H04N 9/31* (2006.01)
*H04N 13/04* (2006.01)

(52) U.S. Cl.
CPC .......... *H04N 9/3147* (2013.01); *H04N 13/0459* (2013.01)

(58) Field of Classification Search
USPC .............. 348/565, 564, 569, 515, 512, 423.1, 348/462, 432.1, 385.1, 389.1, 333.1, 231.4, 348/274, 136, 38, 656, 706, 725, 729, 744; 340/4.37, 426.34, 510, 539.25, 952; 345/419, 629; 455/3.06, 41.3, 149, 455/154.1, 309, 312, 350, 414.4, 464, 509; 725/18, 38, 68, 100, 105, 110, 131, 725/139, 151
See application file for complete search history.

(56) References Cited

U.S. PATENT DOCUMENTS

| | | | |
|---|---|---|---|
| 6,226,455 B1 * | 5/2001 | Ishimoto et al. .................. 396/2 |
| 6,396,514 B1 * | 5/2002 | Kohno .......................... 715/753 |
| 2003/0101140 A1 * | 5/2003 | So et al. .......................... 705/51 |
| 2004/0031063 A1 * | 2/2004 | Satoda .......................... 725/143 |
| 2004/0240676 A1 * | 12/2004 | Hashimoto et al. ............. 381/56 |
| 2008/0311940 A1 * | 12/2008 | Uppala ......................... 455/509 |
| 2009/0010324 A1 * | 1/2009 | Yamamoto ............... 375/240.01 |
| 2009/0201125 A1 * | 8/2009 | Ikeguchi et al. ............... 340/5.2 |
| 2009/0212904 A1 * | 8/2009 | Yamashita et al. ........... 340/5.22 |
| 2010/0118195 A1 * | 5/2010 | Eom et al. ..................... 348/564 |
| 2010/0130132 A1 * | 5/2010 | Lee et al. ..................... 455/41.3 |
| 2011/0138439 A1 * | 6/2011 | Toba ............................. 725/148 |
| 2011/0148789 A1 * | 6/2011 | Kim et al. ..................... 345/173 |

* cited by examiner

*Primary Examiner* — Jefferey Harold
*Assistant Examiner* — Mustafizur Rahman
(74) *Attorney, Agent, or Firm* — Bacon & Thomas, PLLC (57) ABSTRACT

An audio-video system for a sports café that is configured to allow multiple people to simultaneously view multiple images and listen to audio corresponding to selected images including: a large screen; a setup box for receiving a plurality of broadcasting channels; an image synthesizer for synthesizing the plural image channels into one image; an image selector for selecting and outputting one image selected from the plural image channels or synthesized image; a projector for projecting the image from the image selector; an audio selector for selecting one audio channel among the plural audio channels output corresponding to the selected image for output of a speaker; an audio amplification unit for amplifying the audio selected by the audio selector; and an audio collecting unit for controlling the directional output of the audio from the speaker.

7 Claims, 7 Drawing Sheets

AUDIO-VIDEO SYSTEM FOR SPORTS CAFES

CROSS-REFERENCE TO RELATED APPLICATION

This application claims priority to Korean Patent Application No. 10-2011-0086251, filed on Aug. 29, 2011 at the Korean Intellectual Property Office, the entirety of which is incorporated herein by reference.

FIELD OF THE INVENTION

The present invention relates to an audio-video system for sports cafés where a crowd of people can watch a sporting event that is broadcast onto a screen, where several pictures or a large picture are shown on a single screen to view several scenes or a selected scene while audio is selected and listened to at a table.

BACKGROUND

Generally, beer cafés or restaurants provide several PDP monitors so that people sitting in their chairs can view a sporting event broadcasted on one of the several monitors.

This configuration, however, provides a small picture size of 40-50" and requires a high installation cost to install the several PDP monitors and further the power consumption is high to operate the several PDP monitors.

In other configurations, a large picture is provided on a screen along with several PDP monitors so that multiple sporting events can be viewed simultaneously.

In this case, the large screen and the amount of the monitors that can be used are limited by the size of the sports bar. Generally, when a single large screen in installed only a few additional monitors, which have small viewing areas, can be installed which makes it difficult to view other sporting events.

Further, in cases where several images are viewed on one large screen, there is no control of the audio sent from the respective pictures so that the audio is a mixed audio channel.

SUMMARY

The object of the present invention relates to an audio-video system for a sports café where several pictures are viewed simultaneously on a larger screen, i.e., a screen that is 80" or larger, and is configured so that audio can be selected and listened to at each table, or one image can be projected as a large picture on the large screen.

In one embodiment of the present invention the audio-video system for a sports café includes: a large screen that is 80" or larger; a setup box for receiving a plurality of broadcasting channels; an image synthesizer for synthesizing the plural image channels into one image; an image selector for selecting and outputing one image selected among the plural image channels or the synthesized image; a projector for projecting the image from the image selector; an audio selector for selecting one audio channel among the plural audio channels output corresponding to the broadcast channels; an audio amplification unit for amplifying the audio selected by the audio selector for output of a speaker; and an audio collecting unit for controlling the directional output of the audio from the speaker.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION OF VARIOUS EMBODIMENTS OF THE DISCLOSURE

Exemplary embodiments of the present invention will be described below in detail with reference to the accompanying drawings. Wherever possible, the same reference numerals will be used to refer to the same elements throughout the specification, and a duplicated description thereof will be omitted.

Figure 1:
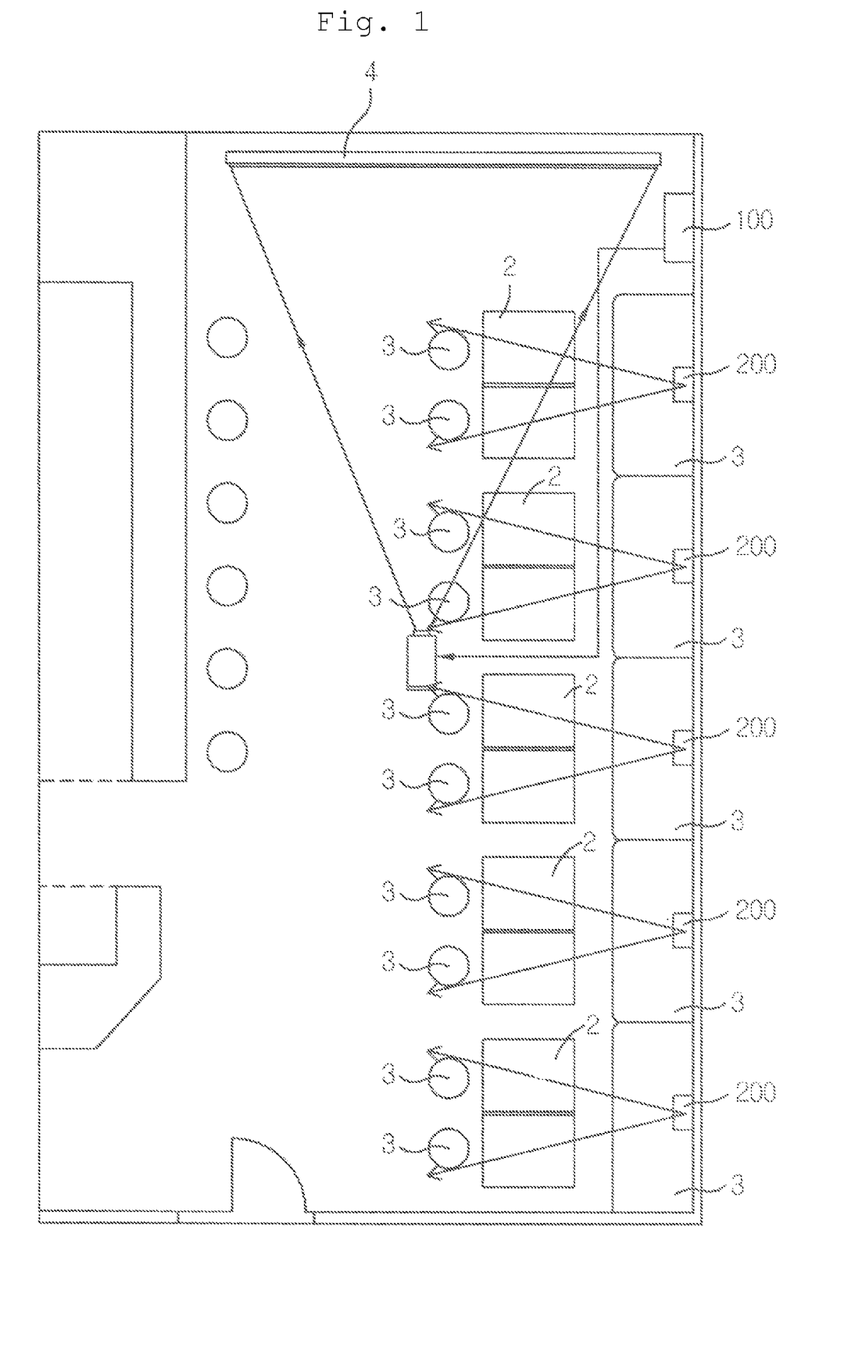
FIG. 1 is a perspective view showing the inside of a café where an audio-video system for a sports café according to the present invention is arranged.

FIG. 1 shows the inside of a small hall such as a sports bar or a coffee shop where an audio-video system according to the present invention is arranged. The audio-video system includes a screen 4 provided at a front portion of the inside of the café. A plurality of viewing stations 2, e.g., tables, posts, other areas where viewers are positioned, are provided inside the café with chairs 3 arranged on left and right sides of the table or viewing station 2 arranged in a way such that a viewer sitting in the chairs 3 can view the image on the screen 4 by turning his/her head.

A plurality of images can be projected on the screen 4 in various formats, for example, 2 pictures, 4 pictures, 9 pictures or 16 pictures can be projected on the screen 4 using PIP (picture in picture) or are spaced equally on the screen 4. For description convenience as discussed below, the plurality of images will be described as 4 pictures projected on the screen 4.

As seen in FIG. 2(a), 4 pictures A, B, C and D, which are different from each other, are configured to be projected on one screen. For example, a baseball game is viewed on picture A, a soccer game is viewed on picture B, an audio program is viewed on picture C, and a movie is viewed on picture D. This configuration allows a person to select the image on one screen depending on his/her fondness.

Further, as seen in FIG. 2(b), a single image of a sporting event final or movie can be viewed as a single picture on the screen 4.

Figure 3:
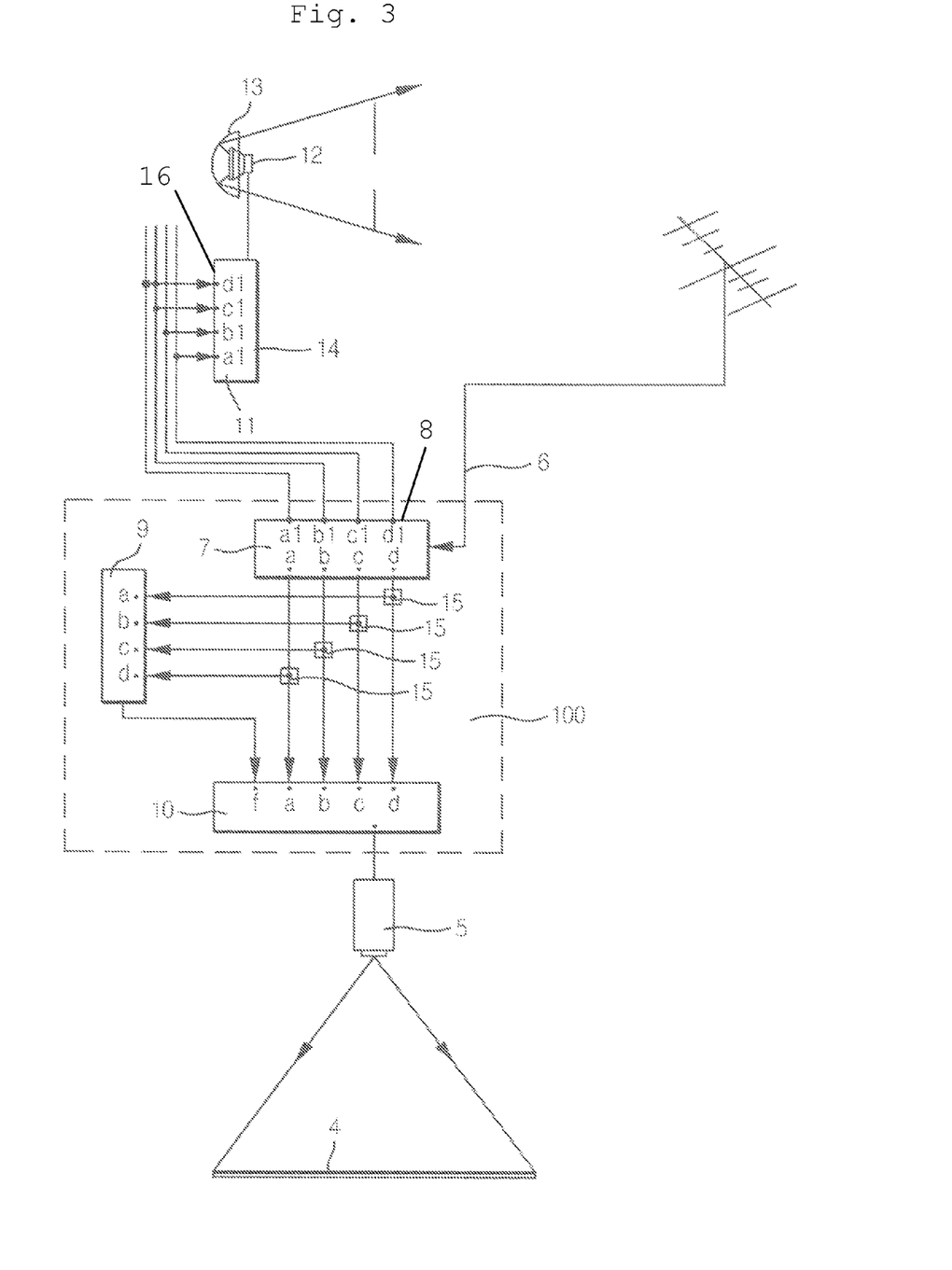
FIG. 3 is a view showing constitutional element of an audio-video system for sports café according to the present invention.
Figure 4:
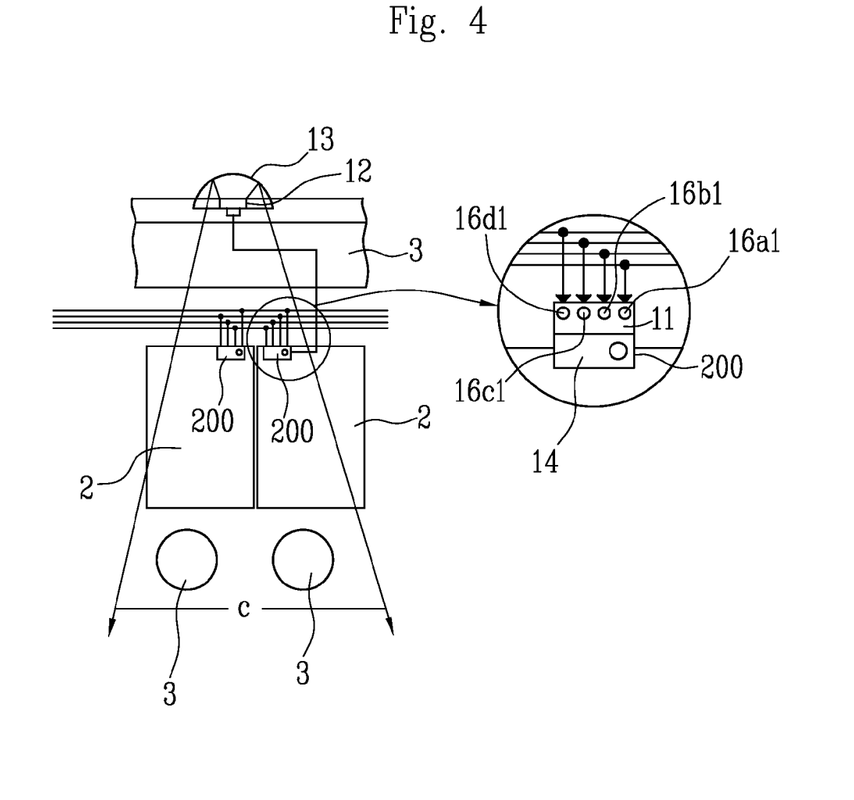
FIG. 4 is a view showing a configuration of a directional speaker connected to a table in the audio-video system for sports café according to the present invention.

FIG. 3 illustrates an apparatus for implementing the configuration for viewing pictures as discussed above, where the audio-video system includes a receiving unit 6, which receives a plurality of images and audio programs through a plurality of channels by airwaves with an antenna, cable broadcasting, DVD, tuner, and/or an image recording media.

The receiving unit is also provided with a setup box 7 including a plurality of channel image output terminals 7a, 7b, 7c, 7d with a plurality of tuners.

The plurality of channel image output terminals 7a, 7b, 7c, 7d that are provided in the setup box 7 branch, i.e., are divided, into two lines using a distributor 15, where the distributor 15 branches one line as an input into an image synthesizer 9 for synthesizing a plurality of images into one image and the other line is input into an image selector 10.

The image synthesizer 9 is configured to output one image f by synthesizing the plurality of images into one image which is then input into the image selector 10.

Accordingly, the image selector 10 includes a selection switch that is used to select the image f or one of the plurality of images a, b, c, d that is input from the setup box 7 via the distributor 15 to project an image on the screen 4 using the projector 5.

Figure 2:
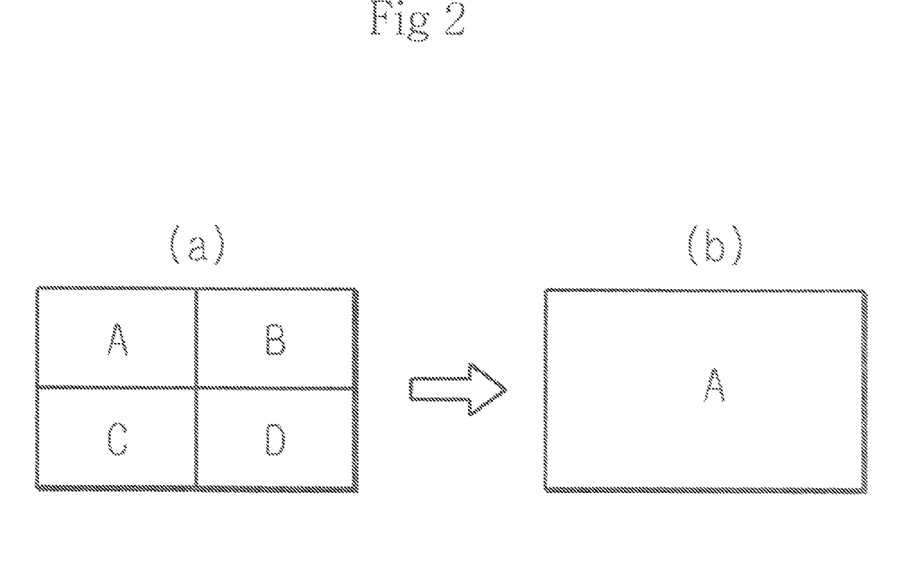
FIG. 2a is a view showing multi images displayed on a screen.
FIG. 2b is a view showing one image displayed on a screen.

The image selector allows the projection of the image f that is composed of 4 pictures, for example, as shown in FIG. 2(*a*), or the projection of one of the images a, b, c, d that are selected to be viewed on the screen 4, for example, as shown in FIG. 2(*b*).

Even though 4 images are discussed above, this configuration would also allow the viewing and projection of an image that includes 9 images or 16 images.

Using this structure, however, it is difficult for multiple people, i.e., viewers, to select the sound associated with one of the image f or plural images a, b, c, d for listening.

Accordingly, as shown in FIG. 3, plural audio output lines 8 are connected to the respective table 2 from plural channel audio output terminals 8a1, 8b1, 8c1, 8d1 of the setup box 7.

An audio selector 11 is used for selecting one of the plural audio output lines 8 of a channel unit output for listening to the audio. Additionally, an audio amplification unit 14 that is configured to amplify the audio of the channel unit that is selected by the audio selector 11 is also provided on the table 2.

The audio amplification unit 14 is then connected to a speaker 12 and/or a headphone.

Figure 5:
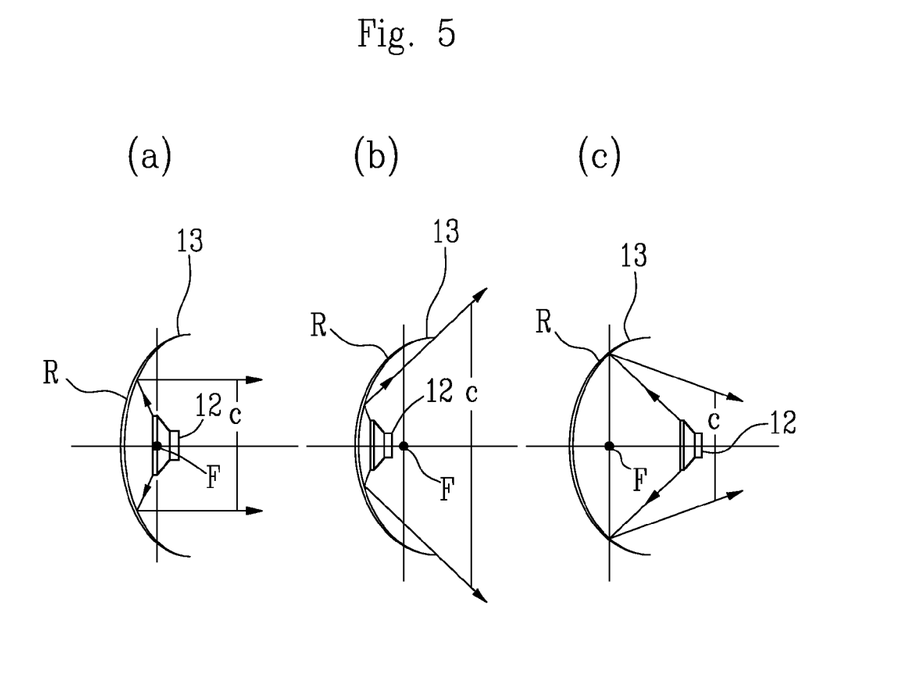
FIG. 5 is a view showing a sound collecting unit in the audio-video system for sports café according to the present invention.

Further, as seen in FIG. 5, the audio amplification unit 14 includes an audio collecting unit 13 for re-directing audio waves collected from the speaker towards the tables 2.

The audio collecting unit 13 is made of wood or plastic where the audio collecting unit 13 is configured as a concave shape having a curved surface R and a focal point F that is disposed half way, i.e., at a half point (½), along a curvature of the curved surface R. As shown in FIG. 5*a*, when the speaker 12 is disposed on the focal point F, the diffusion range c, i.e., the reflection of the audio waves, is reflected in a straight manner. When the speaker 12 is disposed closer to the audio collecting unit 13 at a distance that is within the focal point F, the audio diffusion range c becomes wider, i.e., the audio waves are reflected at a wider angle than the aforementioned configuration. Lastly, when the speaker 12 is disposed further away from the audio collecting unit 13 at a distance that is outside the focal point F, the audio diffusion range c becomes narrower.

In view of the above identified structures which consider the diffusion range c as shown in FIGS. 5*a*, 5*b*, 5*c*, the locations of the tables 2, the chairs 3, and the speakers 12 can be arranged efficiently to effectively receive the audio associated with the images.

Figure 6:
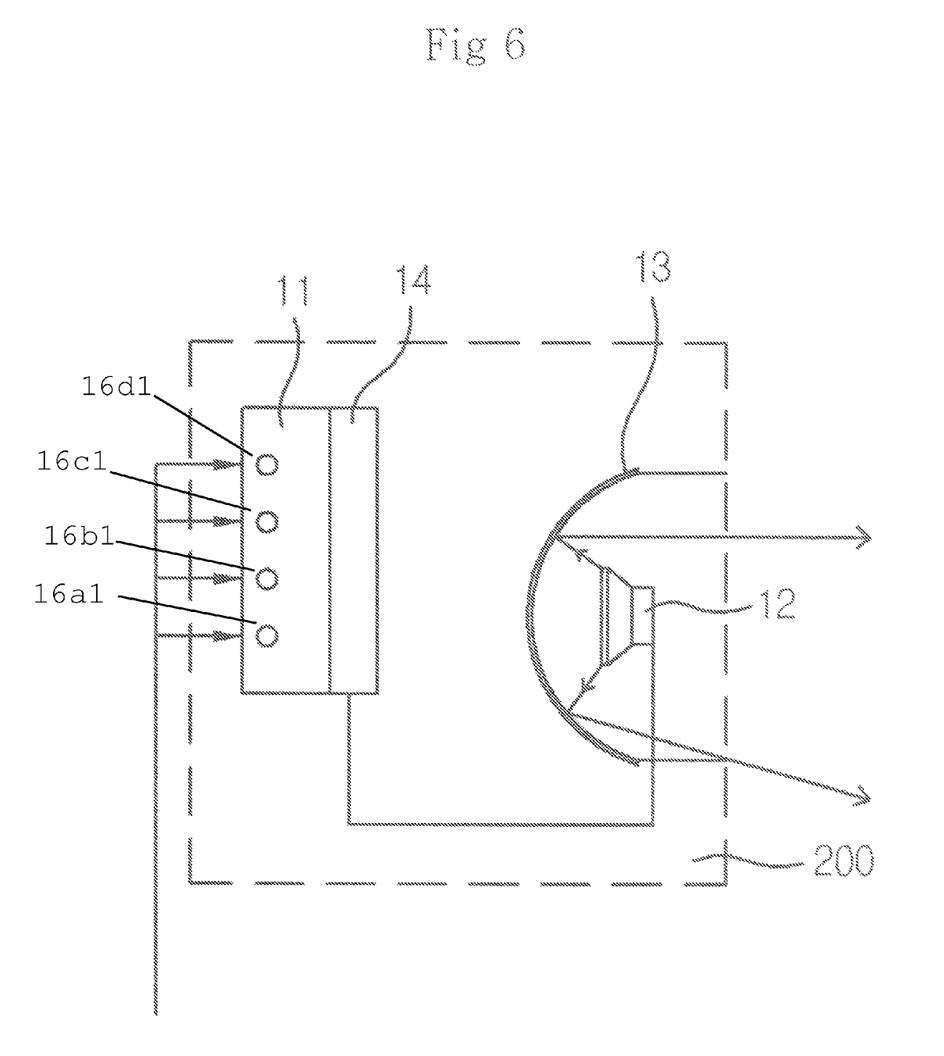
FIG. 6 is a view showing an audio box in the audio-video system for sports café according to the present invention.

As shown in FIG. 6, this audio arrangement allows the audio to be diffused directionally around the table 2 and the chair 3 so that when one image is selected among the several images displayed on the screen 4, the audio corresponding to the image is selected by the audio selector 11.

Additionally, the audio volume can be adjusted using the audio amplification unit 14.

Further, the setup box 7 having a plurality of channels, the image synthesizer 9 for synthesizing a plurality of images into one image, and the image selector 10 for receiving a plurality of images and selecting an image can be configured as a printed circuit board in one box, for example, as a single control box 100.

The control box 100 may be provided inside or outside the projector 5 as a single structure to allow the simple installation and convenient use of the control box 100.

Figure 7:
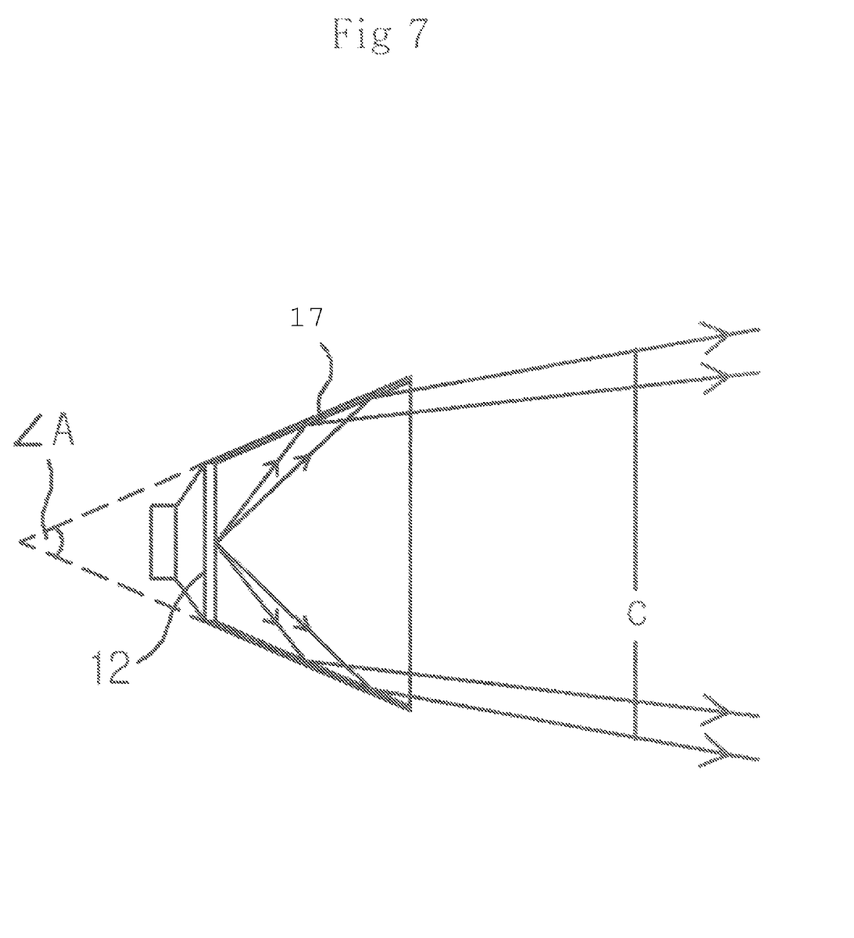
FIG. 7 is a view showing an audio passing tube in the audio-video system for sports café according to the present invention.

Similar to the audio collecting unit 13, as shown in FIG. 7, an audio passing tube 17 can be provided in front of the speaker 12 for diffusing the audio waves in the intended direction. The audio passing tube 17 has an inclination angle ∠A provided at a back side of the speaker 12 so that the audio from the speaker 12 is diffused appropriately to the table 2 through the inclination angle ∠A. Additionally, the audio passing tube 17 can be used in conjunction with the audio collecting unit 13.

As seen in FIG. 6, the audio selector 11 connected to the plural audio input terminals 16a, 16b, 16c, 16d, the audio amplification unit 14 for amplifying the selected audio, the speaker 12, and the audio collecting unit 13 for deciding the audio diffusion range of the speaker 12 can also be configured as a single box 200 so that the audio unit can be easily installed and handled.

It will be appreciated that the number of audio channels can be increased depending on the amount of images projected on the screen 4 so that the audio selector 11 and the audio amplification unit 12 can correspond to the selected image.

It also will be appreciated that several projectors can be provided so that the screens 4 may be arranged on left and right sides of the café. The above identified configuration allows the selection of the audio associated with corresponding images.

With respect to 3D imaging, a plurality of projectors 5 can be provided, where the 3D imaging occurs by polarizing the images from a 3D projector using a polarization plate or by using a 3D projector that projects left and right images in sequence. In different embodiments of the present invention, when a screen 4 has size of 120", 16 pictures of 30" or 9 pictures of 40" or 4 pictures of 60" can be provided. The audio corresponding to the selected picture or image can be selected at the table.

Accordingly, up to 16 different sports games, news programs, or movies can be viewed and listened to simultaneously on a large screen in small place, or one large image among the plurality of images can be selected and viewed, and where the audio can be selected and listened to in the table.

Further, by having a plurality of pictures projected on one screen using a single projector, a reduction in the installation costs and power consumption when using several monitors can be achieved. Additionally, this configuration allows several images to be provided even in a small area.

Accordingly, the present invention can be applied to a public place such as sports bar, beer café, coffee shop, rest room, airport, or bus terminal.

While the invention has been shown and described with reference to exemplary embodiments thereof, it will be understood by those skilled in the art that various changes in form and details maybe made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. An audio-video system configured to allow multiple people to view images and listen to audio corresponding to the images comprising:
    a setup box configured to receive and output a plurality of image channels and a plurality of audio channels;
    a plurality of distributors, each of said plurality of distributors configured to receive an image channel and divide the image channel into at least a first and second channel;
    an image synthesizer configured to receive at least the first channel from the plurality of distributors and synthesize the received first channels into one image;
    an image selector configured to receive the synthesized image from the image synthesizer and the second image channels from the plurality of distributors, said image selector configured to select and output at least one image selected from the second image channels from the plurality of distributors or the synthesized image;
    a projector configured to project the image output selected by the image selector;
    an audio selector configured to receive the plurality of audio channels and select one audio channel from the plurality of audio channels;
    a speaker configured to receive and output the selected audio from the audio selector; and
    a viewing station comprising the audio selector and the speaker,
    wherein the plurality of images or synthesized image is selected for projection on a screen, and one audio channel is selected from the plurality of audio channels at the viewing station.

2. The audio-video system according to claim 1, wherein the speaker comprises an audio collecting unit in front of a front surface of the speaker so that the audio collecting unit receives audio from the speaker and deflects the audio towards a viewer at the viewing station, and an audio passing tube coupled to the front surface of the speaker configured so that an audio diffusion angle of the speaker is adjustable.

3. The audio-video system according to claim 1, wherein the audio selector, the audio amplification unit, and the speaker form a single box and the viewing station comprises a table.

4. The audio-video system according to claim 1, wherein the projector is configured to project 3D images.

5. The audio-video system according to claim 1, wherein the setup box, the image synthesizer, and the image selector form a single control box and the viewing station comprises a table.

6. The audio-video system according to claim 5, wherein the control box is connected to the projector.

7. The audio-video system according to claim 1, wherein the viewing station comprises a table.

* * * * *